United States Patent
Kramasz, Jr. et al.

[15] 3,686,941
[45] Aug. 29, 1972

[54] VEHICLE MOUNTED DYNAMOMETER AND METHOD

[72] Inventors: Joseph G. Kramasz, Jr.; Dennis P. Hanrahan, both of Concord, Calif.

[73] Assignee: Kodekey Electronics Inc., Concord, Calif.

[22] Filed: Nov. 23, 1970

[21] Appl. No.: 91,890

[52] U.S. Cl. ..............................73/117.3, 73/136 R
[51] Int. Cl. ...............................................G01l 5/13
[58] Field of Search...73/116, 136 R, 117.3; 324/168

[56] References Cited

UNITED STATES PATENTS

| | | | |
|---|---|---|---|
| 2,946,219 | 7/1960 | Kemper | 73/136 |
| 3,433,065 | 3/1969 | Mergler | 324/168 UX |
| 3,426,588 | 2/1969 | Duda | 73/141 A |

Primary Examiner—Jerry W. Myracle
Attorney—Flehr, Hohbach, Test, Albritton & Herbert

[57] ABSTRACT

A vehicle having an engine and a rigid frame has the engine mounted to the rigid frame by compressible engine mounts. The engine rotates a drive shaft and a switch mounted adjacent the drive shaft is adapted to be actuated by means carried by the drive shaft so that the frequency of actuation is proportional to the frequency of rotation of the drive shaft. The switch supplies a velocity signal proportional to the rotation frequency of the drive shaft. A torque transducer is mounted on the rigid frame adjacent the engine mount and extends into contact with the engine such that the displacement of the engine mount is measured to generate a torque signal. The velocity signal and torque signal are combined to produce a relative horsepower signal which is displayed on an appropriate meter.

4 Claims, 6 Drawing Figures

Patented Aug. 29, 1972

INVENTORS
JOSEPH G. KRAMASZ, JR.
DENNIS P. HANRAHAN

By Flehr, Hohbach, Test,
Albritton & Herbert
ATTORNEYS

Patented Aug. 29, 1972

INVENTORS
JOSEPH G. KRAMASZ, JR.
DENNIS P. HANRAHAN

By Flehr, Hohbach, Test,
Albritton & Herbert
ATTORNEYS

VEHICLE MOUNTED DYNAMOMETER AND METHOD

BACKGROUND OF THE INVENTION

This invention pertains to a dynamometer for measuring the horsepower of an engine and in particular pertains to a dynamometer and method for using the same wherein the dynamometer is mounted on the vehicle and adapted to indicate the relative horsepower output thereof.

A dynamometer is an apparatus for measuring mechanical power such as the power output of an engine. Generally, dynamometers are relatively large and complex affairs. For example, one kind of prior art dynamometer for measuring an engine's output horsepower consists of an engine bed with a loading means for applying a load to the drive shaft of the engine and sensing the torque applied thereto. In another type of prior art dynamometer specifically adapted for measuring the horsepower output of a vehicle, the engine remains in the vehicle with the loading and torque output sensed, for example, at the rear wheels of the vehicle. A tachometer is also provided for concurrently measuring the r.p.m. of the engine. Such prior art dynamometers are useful but are limited in that they are unable to give a horsepower rating for a vehicle which takes into account the actual conditions under which the vehicle is operated. For example, such static dynamometers do not take factors such as wind resistance and vehicle load into account. Further, vehicle accessories such as hood scoops found on many present day vehicles for producing a "ram-air" effect do influence the power output of an engine but their influence cannot be measured using such prior art static dynamometers. Thus what is needed is a portable or vehicle mounted dynamometer which can give continuous relative horsepower readings while the vehicle is being operated. With such a dynamometer an engine may be effaciously tuned to deliver maximum output since the effect of adjustments to the engine such as changing sparkplugs, for example, may be readily seen.

SUMMARY OF THE INVENTION

Accordingly, it is an object of this invention to provide an improved dynamometer.

It is a more specific object of this invention to provide a vehicle mounted dynamic dynamometer for giving relative horsepower readings while a vehicle is being operated.

Briefly, in accordance with one embodiment of the invention there is provided a vehicle mounted dynamometer for measuring the relative horsepower output of a vehicle of the type having an engine mounted by compressible engine mounts to a rigid frame, the engine adapted to rotate a drive shaft, and including means for measuring the rotation frequency of the drive shaft and generating a velocity signal proportional to the frequency. Means are also provided for measuring displacement of the compressible engine mounts and generating a torque signal proportional to such displacement. The torque signal and velocity signal are combined to produce a relative horsepower signal which is displayed.

DESCRIPTION OF THE PREFERRED EMBODIMENT

Figure 2:
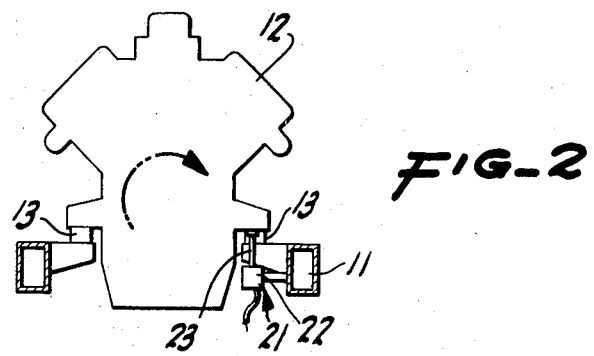
FIG. 2 is a diagrammatic end view of the engine of FIG. 1 specifically illustrating the positioning of the torque transducer.
Figure 1:
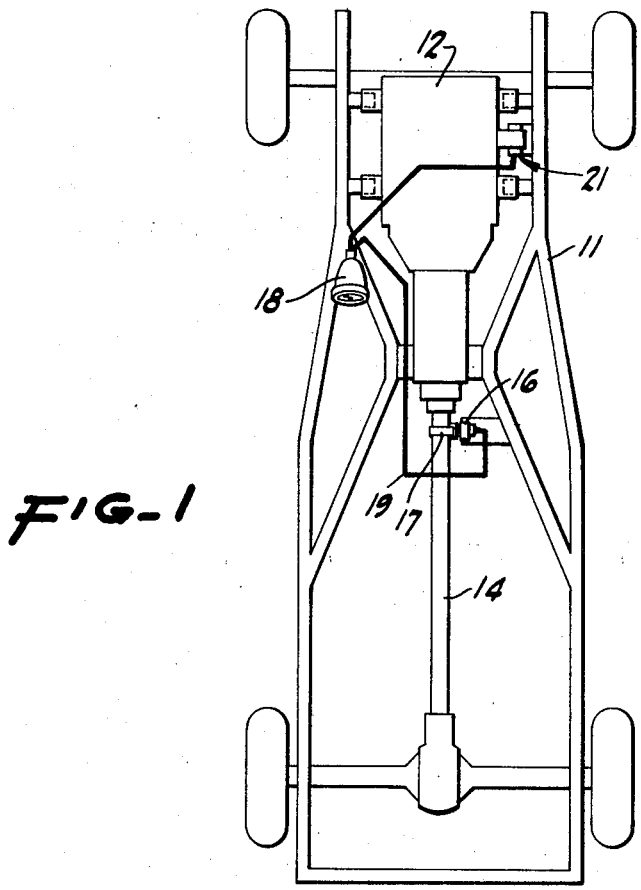
FIG. 1 is a diagrammatic illustration of a vehicle frame and engine illustrating the positioning of the elements of a dynamometer in accordance with this invention.
Figure 4:
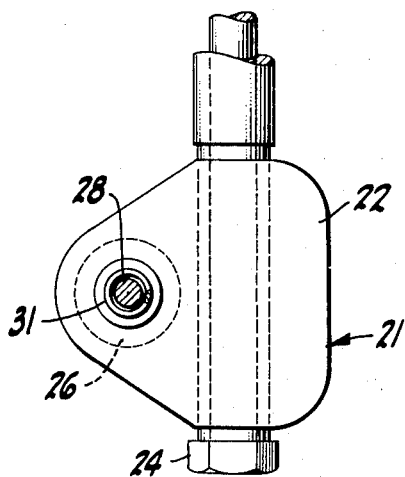
FIG. 4 is a sectional view of the torque transducer of FIG. 3 taken along the lines 4—4 therein.

Referring now to FIGS. 1 and 2 a typical vehicle includes a rigid frame 11 with an engine 12 which is mounted to the rigid frame 11 by means of compressible engine mounts 13. The engine 12 rotates a drive shaft 14. A switch generally indicated by reference numeral 16 is mounted to the frame 11 adjacent the drive shaft 14 and in close proximity to an actuating means 17 carried by the drive shaft 14. The switch 16 is connected to a display and electronic module 18 by a conductor 19.

A torque transducer 21 is fixedly mounted to the rigid frame 11 by means such as bracket 22 in the vicinity of the compressible engine mounts 13. The torque transducer 21 has an extended portion 23 which is adapted to bear against a portion of the engine 12.

Figure 3:
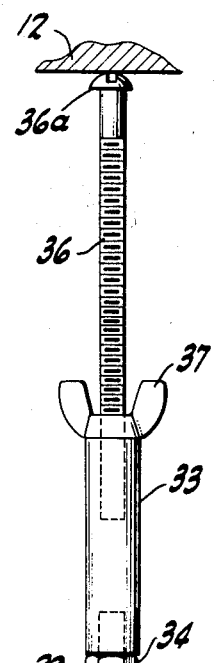
FIG. 3 is an enlarged elevation partly in cross section of the torque transducer.

Referring now to FIG. 3, there is shown an enlarged detailed view of the torque transducer 21. The torque transducer 21 includes a housing 22 and mounting means such as bolts 24 for mounting the torque transducer 21 to the bracket 22. The torque transducer 21 comprises a linear variable differential transformer 26 which includes a plurality of coils generally indicated by reference numeral 27 and a permeable core 28 mounted for relative movement with respect to the plurality of coils 27 for varying the magnetic coupling therebetween. The linear variable differential transformer may be of the type manufactured by Schaevitz Engineering in Pennsauken, New Jersey and designated as their model E-100-D. Operation of the linear variable differential transformer is more fully discussed hereinafter in connection with the description of the circuit thereof. The permeable core 28 has a threaded portion 28a which is adapted to threadedly engage an extended member 29 which is spring loaded by a spring 31 bearing against a washer 32 disposed around the extended member 29 adjacent the housing 22. The extended member 29 is adapted to threadedly engage a spacer 33 and be fixed in position with respect thereto by a jam nut 34. The spacer 33 also threadedly receives a screw 36 which may be fixed in position with respect to the spacer 33 by means such as wing nut 37. The screw 36 is adapted to contact a portion of the engine 12 and the screw 36 is adjustable by loosening the wing nut 37 and rotating the screw 36 into or out of the spacer 33 until the head 36a of screw 36 just contacts the portion of the engine 12 with the engine 12 not running. In this manner, when the engine 12 is running it rotates in the direction shown by the arrow in FIG. 2 so as to produce a torque loading on the compressible engine mounts 13 situated on the right hand side of the engine 12. The torque transducer 21 is adapted to sense this torque loading by measuring the displacement of the compressible engine mounts 13 and generating a torque signal proportional thereto. As the engine 12 is torqued the screw 36 will be displaced downward causing the spacer 33, the extended member 29 and hence the permeable core 28 to be displaced. Displacement of the permeable core 28 varies the magnetic coupling of the plurality of coils in the linear variable differential transformer 26, generating an electrical signal proportional to the displacement.

Figure 5:
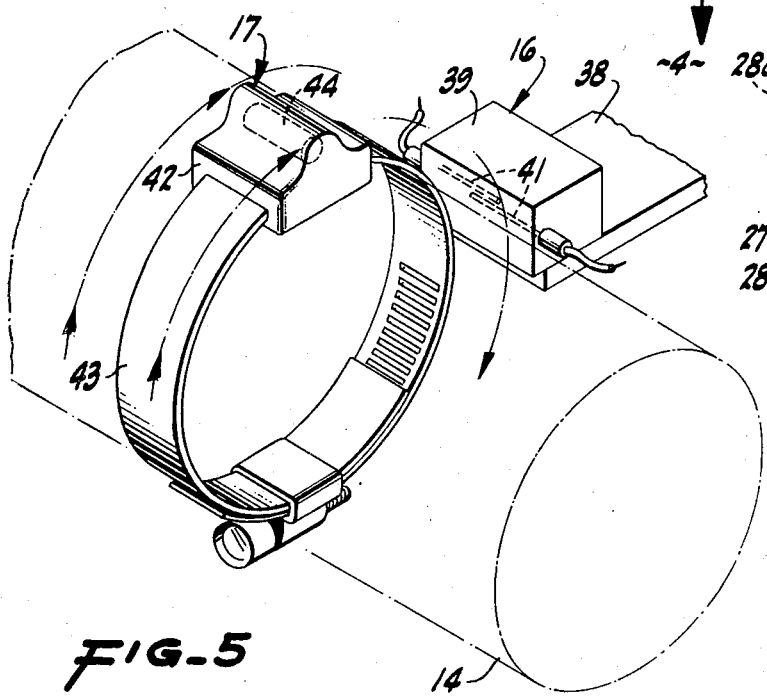
FIG. 5 is an enlarged diagrammatic illustration of the drive shaft in FIG. 1 and illustrating the switch for measuring the rotation frequency of the drive shaft.

Turning now to a consideration of FIG. 5, there is shown a detail of the switch assembly 16 and the actuating means 17 carried by the drive shaft. The switch assembly 16 comprises a bracket 38 adapted to be suitably fixedly mounted to a portion of the rigid frame 11. The bracket 38 mounts a reed switch assembly 39 which includes two switch contacts 41 which are adapted to be magnetically attracted to each other to make contact when under the influence of a magnetic field.

The actuating means 17 attached to the drive shaft 14 comprises a housing 42 and a clamp 43 for fixedly mounting the housing 42 to the drive shaft 14. The housing 42 contains a permanent magnet 44. As the drive shaft 14 rotates, the housing 42 and permanent magnet 44 are rotated past the reed switch assembly 39 so that the contacts 41 are attracted to each other to make an electrical circuit therebetween. Continued rotation of the drive shaft 14 rotates the permanent magnet 44 past the reed switch assembly 39 so that the switch contacts 41 are no longer under the influence of permanent magnet 44 and contact therebetween is broken. In this manner the switch contacts 41 are in contact with each other once during a complete rotation of the drive shaft 14. Thus during a given time the percentage of that time that the switch contacts 41 are in contact with each other is dependent upon the angular velocity or frequency of rotation of the drive shaft 14.

Figure 6:
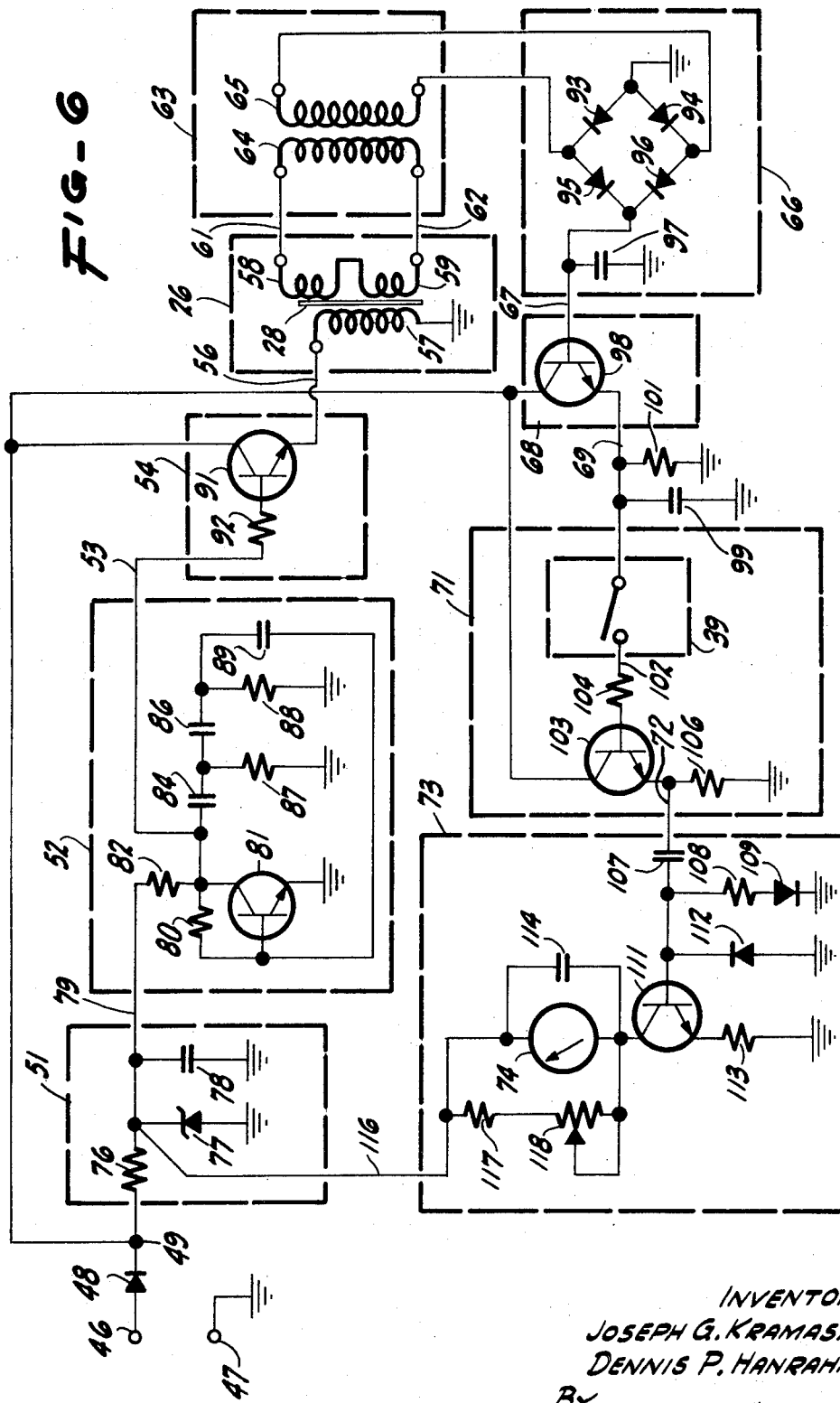
FIG. 6 is a detailed circuit diagram of the electronics of the dynamometer constructed in accordance with this invention.

Referring now to FIG. 6 there is shown a detailed circuit diagram of the dynamometer of this invention, including the electronics contained in the display and electronic module 18 which may, for example, be mounted within the vehicle at a position where it may be viewed by the operator of the vehicle. Terminals 46 and 47 are provided and are adapted to be connected to a source of electrical power. For example, terminal 46 may be connected to the positive terminal of the battery in the vehicle (not shown) and terminal 47 may be connected to the negative terminal of the battery of the vehicle. Terminal 47 is connected to chassis ground for all of the electronics shown in FIG. 6. A diode 48 is connected to the terminal 46 and functions to insure that power is connected to the terminal 49 only if the terminal 46 is connected to a positive source of voltage.

Terminal 49 is connected to a voltage regulator 51 which supplies regulated voltage to a phase shift oscillator 52. The output of phase shift oscillator 52 on conductor 53 is amplified by a current amplifier 54 which also derives power from the terminal 49. The current amplifier 54 supplies a signal via conductor 56 to the primary winding 57 of the linear variable differential transformer 26. The linear variable differential transformer 26 also includes oppositely wound balanced secondary windings 58 and 59. Coupling from the primary winding 57 to the balanced secondary windings 58 and 59 is accomplished by means of the permeable core 28. As previously discussed, the permeable core 28 is adapted to be displaced in response to torquing of the engine so as to vary the magnetic coupling between the primary winding 57 and the balanced secondary windings 58 and 59. Ordinarily, with no displacement of the permeable core 28 there is no output on the conductors 61 and 62. However, as the permeable core 28 is displaced an output appears on conductors 61 and 62 which is linearly proportional to the displacement of the permeable core 28. Conductors 61 and 62 form the input to a voltage step up transformer 63 having a primary winding 64 and a secondary winding 65 which feeds an AC to DC converter 66. The output of the AC to DC converter 66 appearing on conductor 67 forms the input to a current amplifier 68. The output of current amplifier 68 on conductor 69 forms the input to a torque-velocity multiplier 71. The signal appearing on conductor 69 is proportional to the displacement of the permeable core 28 and hence proportional to the torque of the engine. This signal is input to the torque-velocity multiplier 71 through the reed switch assembly 39 which it will be remembered is closed only a portion of the time with the portion of time it is closed during a given span of time being proportional to the angular velocity or frequency of rotation of the drive shaft. Thus the signal applied on conductor 72 is a signal proportional to the product of the engine torque and velocity, which is proportional to the relative horsepower of the vehicle. This signal on conductor 72 forms the input to a pulse shaper and integrator 73. The pulse shaper and integrator 73 integrates and shapes the signals on conductor 72 for driving a meter 74 so that the meter 74 which may be, for example, mounted within the vehicle in view of the driver, gives a continuous reading of relative horsepower output of the vehicle.

Turning now to a consideration of the detailed components involved in each of the circuits, the voltage regulator 51 includes a current limiting resistor 76, a Zener diode 77 and a capacitor 78 connected in parallel therewith for establishing a regulated voltage on the conductor 79. The phase shift oscillator 52 includes a transistor 81 whose collector is connected through a resistor 82 to the conductor 79. The collector of transistor 81 is also connected through a biasing resistor 80 to the base of transistor 81, and the emitter of transistor 81 is grounded. A feedback circuit for the transistor 81 comprises capacitors 84 and 86 and resistors 87 and 88 which shift the phase of the signal on the collector of transistor 81 and feed it back into the base of transistor 81 through a capacitor 89. The output of the phase shift oscillator 52 on conductor 53 is therefore a sine wave having a frequency of approximately 2500 Hz.

The output of phase shift oscillator 52 on the conductor 53 is amplified by a current amplifier 54 comprising a transistor 91 whose base is connected through a resistor 92 to the conductor 53. The output of the current amplifier 54 is taken off the emitter of transistor 91 on a conductor 56 which drives the primary winding 57 of the linear variable differential transformer 26. As previously discussed, displacement of the permeable core 28 unbalances the secondary windings 58 and 59 such that an output is produced on conductors 61 and 62. This output is stepped up in voltage by the voltage step up transformer 63 which may, for example, have a primary to secondary turns ratio of 1:20. The output of the voltage step up transformer 63 is rectified by the AC to DC converter 66. The AC to DC converter 66 comprises diodes 93 through 96 arranged in a full wave bridge and a filtering capacitor 97. The output of the AC to DC converter 66 on conductor 67 forms the input to a current amplifier 68 comprising a transistor 98. The output of current amplifier 68 is taken off the emitter of transistor 98 and is further filtered by a parallel combination of a capacitor 99 and a resistor 101. The signal on conductor 69 is thus a DC signal whose amplitude is proportional to the displacement of the permeable core 28 of the linear variable differential transformer 26. This signal on the conductor 69 forms the input to the reed switch 39. It will be remembered that the reed switch 39 is closed only a portion of the time with the percentage of the time that the reed switch is closed being directly proportional to the angular velocity or frequency of rotation of the drive shaft of the vehicle. Therefore the output of the reed switch assembly 39 on the conductor 102 is a signal whose amplitude is proportional to the deflection of the permeable core 28 (which is proportional to the torque output of the engine) and whose repetition rate is proportional to the angular velocity or frequency of rotation of the drive shaft of the vehicle. This signal on conductor 102 is applied to the base of a transistor 103 through a resistor 104. The emitter of transistor 103 is connected to ground through a resistor 106 and the output of the torque-velocity multiplier 71 on conductor 72 is taken at the emitter of transistor 103. A capacitor 107 is provided which determines the rise and fall time of the varying output on the emitter of transistor 103. A series combination of a resistor 108 and a diode 109 is connected between the capacitor 107 and ground and together with the base of a transistor 111 form a voltage divider with most of the positive spikes in the signal on conductor 72 being dropped across the resistor 108 with the remainder of the positive signal being applied to the base of transistor 111. Another diode 112 is connected between the capacitor 107 and ground and functions to drop all negative spikes to ground so that negative spikes do not reach the base of transistor 111. The emitter of transistor 111 is connected through a resistor 113 to ground. The signal on the collector of transistor 111 is a shaped signal with the negative spikes and most of the positive spikes removed. A capacitor 114 functions to integrate the signal on the collector of transistor 111 which is applied across the meter 74. Conductor 79 on which is present a regulated DC voltage of approximately 10 volts is connected via a conductor 116 and dropping resistor 117 and a potentiometer 118 across the meter 74 and to the collector of transistor 111. Thus the signal on the collector of transistor 111 controls deflection of the meter 74 with the potentiometer 118 being adjustable to initially calibrate or vary the range of the meter 74.

Thus what has been described is an improved dynamometer which is adaptable to be mounted on a vehicle and carried by the vehicle while the vehicle is being used. In this manner all the factors which influence the horsepower output of a moving vehicle can be analyzed with such factors as wind resistance taken into account. Although a specific embodiment of the invention has been described, it should be obvious that minor modifications and variations in the specific embodiment disclosed herein may be made by those skilled in the art without departing from the true spirit and scope of the invention.

We claim:

1. The combination of a dynamometer and an engine assembly, the engine assembly including a rigid frame, an engine and a drive shaft, said engine mounted by compressible engine mounts to a rigid frame, the engine adapted to rotate a drive shaft, the dynamometer comprising a linear variable differential transformer mounted to the rigid frame and having an input, an output and a displaceable permeable core in contact with and deflected by the engine for varying the magnetic coupling between said input and said output in response to torquing of the engine, means for applying a voltage to said linear variable differential transformer input whereby a torque output signal is formed on said linear variable differential transformer output proportional to the torque output of the engine, a relative horsepower reading meter having a meter input, switching means having an input and an output, said switching means input being coupled to said linear variable differential transformer output, said switching means being actuated by rotation of the drive shaft such that the amount of time said switching means is closed is directly proportional to the angular velocity or frequency of rotation of the drive shaft whereby a horsepower signal is generated on said switching means output having a magnitude proportional to the torque output of the engine and having a repetition rate proportional to the rotation frequency of the drive shaft, and coupling means for coupling said horsepower signal on said switching means output to said meter input.

2. The combination of claim 1 wherein said coupling means includes shaping means and integration means for smoothing and integrating said switching output, whereby the signal at said meter input has an instantaneous average amplitude proportional to the instantaneous relative horsepower developed by the vehicle.

3. The combination of claim 1 wherein said switching means comprises a reed switch mounted to the rigid frame and an actuating magnet mounted to the drive shaft for actuating said reed switch as the drive shaft rotates.

4. The combination of claim 1 wherein said means for applying a voltage to said linear variable differential transformer input comprises a phase shift oscillator for producing a sinusoidally varying input voltage.

* * * * *